(12) United States Patent
Lin et al.

(10) Patent No.: US 10,778,447 B2
(45) Date of Patent: Sep. 15, 2020

(54) METHOD AND SYSTEM FOR SAFELY SWITCHING BETWEEN PRODUCT MODE AND DEVELOPMENT MODE OF TERMINAL

(71) Applicant: FUJIAN LANDI COMMERCIAL EQUIPMENT CO., LTD., Fuzhou, Fujian (CN)

(72) Inventors: Jinhan Lin, Fujian (CN); Yixuan Hong, Fujian (CN)

(73) Assignee: FUJIAN LANDI COMMERCIAL EQUIPMENT CO., LTD., Fuzhou (CN)

( * ) Notice: Subject to any disclaimer, the term of this patent is extended or adjusted under 35 U.S.C. 154(b) by 326 days.

(21) Appl. No.: 15/867,667

(22) Filed: Jan. 10, 2018

(65) Prior Publication Data

US 2018/0139060 A1 May 17, 2018

Related U.S. Application Data

(63) Continuation of application No. PCT/CN2016/089765, filed on Jul. 12, 2016.

(30) Foreign Application Priority Data

Jul. 16, 2015 (CN) .......................... 2015 1 0417560

(51) Int. Cl.
*H04L 29/06* (2006.01)
*H04L 9/32* (2006.01)
(Continued)

(52) U.S. Cl.
CPC .......... *H04L 9/3268* (2013.01); *G06F 21/123* (2013.01); *G06F 21/74* (2013.01);
(Continued)

(58) Field of Classification Search
CPC ... H04L 9/3268; H04L 9/0897; H04L 9/3226; H04L 9/3234; G06F 21/123; G06F 21/74
(Continued)

(56) References Cited

U.S. PATENT DOCUMENTS 6,711,684 B1 * 3/2004 Moroney .............. G06F 21/572
 713/191
7,366,906 B2 * 4/2008 Enokida .............. H04L 63/0823
 713/156
(Continued)

FOREIGN PATENT DOCUMENTS

CN 103686951 A 3/2014
CN 105120066 A 12/2015

OTHER PUBLICATIONS

Chen,"OAuth Demystified for Mobile Application Developers", 2014, ACM, pp. 1-12 (Year: 2014).*
(Continued)

*Primary Examiner* — Taghi T Arani
*Assistant Examiner* — Gregory A Lane

(57) ABSTRACT

The invention provides a method and system for safely switching between product mode and development mode of a terminal, aiming at addressing the problem in the prior art that the terminal in a testing development version may be accidentally circulated into the market and cause hidden safety risk. According to the invention, different Certificate Authorities (CAs) are configured for the terminal at different stages; by storing the public-private key pairs of the certificates issued by different CAs in different secure storage media, only if the secure storage medium corresponding to the current CA state of the terminal is verified to be valid, the flags of the terminal can be successfully rewritten; a safe switching between different CA states of the terminal is realized. It is ensured that the terminal in the testing development stage cannot be used normally, thereby improving the safety of the terminal device.

9 Claims, 3 Drawing Sheets

(51) Int. Cl.
*G06F 21/74* (2013.01)
*G06F 21/12* (2013.01)
*H04L 9/08* (2006.01)

(52) U.S. Cl.
CPC .......... *H04L 9/0897* (2013.01); *H04L 9/3226* (2013.01); *H04L 9/3234* (2013.01)

(58) Field of Classification Search
USPC ........................................................ 713/157
See application file for complete search history.

(56) References Cited

U.S. PATENT DOCUMENTS

| | | | | |
|---|---|---|---|---|
| 8,581,618 | B1* | 11/2013 | Fritz | H03K 19/17768 326/37 |
| 2010/0217964 | A1* | 8/2010 | Peterka | G01R 31/31719 713/2 |
| 2010/0306840 | A1* | 12/2010 | Yoshida | H04N 1/00949 726/9 |
| 2012/0110654 | A1* | 5/2012 | Alrabady | H04L 9/3263 726/10 |
| 2012/0311314 | A1* | 12/2012 | Cumming | G06F 21/51 713/2 |
| 2013/0318354 | A1* | 11/2013 | Entschew | G06F 21/645 713/175 |
| 2014/0075517 | A1* | 3/2014 | Alrabady | G06F 21/572 726/4 |
| 2015/0113278 | A1* | 4/2015 | Cocchi | G06F 21/575 713/171 |

OTHER PUBLICATIONS

International Search Report of PCT Patent Application No. PCT/CN2016/089765 dated Oct. 14, 2016.

* cited by examiner

US 10,778,447 B2

METHOD AND SYSTEM FOR SAFELY SWITCHING BETWEEN PRODUCT MODE AND DEVELOPMENT MODE OF TERMINAL

CROSS REFERENCE TO RELATED APPLICATIONS

The present application is a Continuation Application of PCT Application No. PCT/CN2016/089765 filed on Jul. 12, 2016, which claims the benefit of Chinese Patent Application No. 201510417560.1 filed on Jul. 16, 2015. All the above are hereby incorporated by reference.

FIELD OF THE INVENTION

The invention relates to a method and system for safely switching between product mode and development mode of a terminal.

BACKGROUND OF THE INVENTION

Any device has to experience a development process before it can be released as a formal product. Especially for a special terminal device having safety performance requirements, such as a POS terminal, the distinction between the development stage and the product stage is of particular importance. If the POS terminal device that is still under development is erroneously released and circulated as a formal product, there is a great hidden safety risk for the POS terminal. Thus, normal use of the POS terminal is seriously affected, and the interests of users and operators cannot be guaranteed. Therefore, a distinction is realized between the development mode and the product mode of the terminal device so as to separate the authorities of actual development from the authorities of actual product, thereby improving the safety of the terminal device.

In Chinese patent application No. 201210322713.0, a method for switching operation modes of a terminal as well as a terminal are provided, wherein It is detected whether a preset operation mode switching condition is met for the terminal. If the preset operation mode switching condition is met, the terminal is switched from a first operation mode to a second operation mode, and reception and processing of paging messages are realized.

In the above application document, the improvement is not realized in respect of the safety performance requirements of the terminal, and only the switching of one message receiving operation mode in the operation states of the terminal is provided. The problem to be solved is not to improve the safety performance of the terminal device. Therefore, in view of the above problems, it is necessary to provide a method and system for safely switching between product mode and development mode of a terminal.

SUMMARY OF THE INVENTION

The technical problem to be solved by the invention is to provide a method and system for safely switching between product mode and development mode of a terminal so as to separate the development mode from the product mode of the terminal, to avoid circulating of the terminal still in the development stage into the market, and to avoid potential hidden safety risk of the terminal.

In order to address the above technical problem, the invention adopts the following first technical solution:

a method for safely switching between product mode and development mode of a terminal, characterized by comprising:

presetting a product CA and a development CA; pre-arranging the product CA and the development CA in the terminal;

presetting flags in a FLASH inside the terminal so as to correspond to a product state and a development state respectively;

generating a product public-private key pair by a first encryptor, and generating a development public-private key pair by a second encryptor;

issuing a product certificate containing the product public key by using the product CA, and issuing a development certificate containing the development public key by using the development CA;

storing the product certificate and the product private key in a product secure storage medium, and storing the development certificate and the development private key in a development secure storage medium;

sending by a host computer a CA state switching instruction to the terminal;

sending by the terminal the current state to the host computer according to the flags;

reading by the host computer the private key and the certificate stored in a secure storage medium;

sending by the host computer the certificate to the terminal;

verifying by the terminal the validity of the certificate by using the CA corresponding to the current state so as to obtain a fifth verification result;

verifying by the terminal the validity of the private key so as to obtain a sixth verification result;

determining that said secure storage medium corresponds to the current state of the terminal, if the results of both the fifth verification and the sixth verification are valid; and formatting a key storage area of the terminal; and switching the terminal to another state by rewriting the flags.

The invention provides the following second technical solution:

a system for safely switching between product mode and development mode of a terminal is provided, characterized by comprising:

a presetting module which is configured for presetting a product CA and a development CA, and presetting flags in a FLASH inside the terminal to correspond to a product state and a development state respectively;

a pre-arranging module which is configured for pre-arranging the product CA and the development CA in the terminal;

an encryption module which is configured for generating a product public-private key pair using a first encryptor, and generating a development public-private key pair using a second encryptor;

an issuing module which is configured for issuing a product certificate containing the product public key by using the product CA, and issuing a development certificate containing the development public key by using the development CA;

a storing module which is configured for storing the product certificate and the product private key in a product secure storage medium, and storing the development certificate and the development private key in a development secure storage medium;

a first sending module which is configured for sending a CA state switching instruction to the terminal by a host computer;

a second sending module which is configured for sending the current state to the host computer by the terminal according to the flags;

a reading module which is configured for reading by the host computer the private key and the certificate stored in one secure storage medium;

a third sending module which is configured for sending the certificate to the terminal by the host computer;

a first verifying module which is configured for verifying the validity of the certificate by the terminal using the CA corresponding to the current state so as to obtain a fifth verification result;

a second verifying module which is configured for verifying the validity of the private key by the terminal so as to obtain a sixth verification result;

a first determining module which is configured for determining that said one secure storage medium corresponds to the current state of the terminal, if the results of both the fifth verification result and the sixth verification are valid;

a formatting module which is configured for formatting a key storage area of the terminal; and a switching module which is configured for switching the terminal to another state by rewriting the flags.

The invention has the following advantageous effects: different Certificate Authorities (CAs) are configured for the terminal at different stages, and the authorities of the actual development and the actual product of the terminal are separated; by storing the public-private key pairs of the certificates issued by different CAs in different secure storage media, only if the secure storage medium corresponding to the current CA state of the terminal is verified to be valid, the flags of the terminal can be successfully rewritten. Therefore, different CA states of the terminal can be safely switched, it is ensured that the terminal in the testing development stage cannot be normally used even if it is erroneously circulated into the market as a format product, and the interests of users and operators can be guaranteed, improving the safety of the terminal device.

BRIEF DESCRIPTION OF THE ACCOMPANYING DRAWINGS

LIST OF REFERENCE SIGNS

1: presetting module; 2: pre-arranging module; 3: encryption module; 4: issuing module; 5: storing module; 6: first sending module; 7: second sending module; 8: reading module; 9: third sending module; 10: first verifying module; 11: second verifying module; 12: first determining module; 13: formatting module; 14: switching module; 101: signing unit; 102: sending unit; 103: verifying unit.

DETAILED DESCRIPTION OF THE PREFERRED EMBODIMENTS

The main concept of the invention is that: different Certificate Authorities are configured for the terminals at different stages; by storing the public-private key pairs of the certificates issued by different CAs in different secure storage media, only if the secure storage medium corresponding to the current CA state of the terminal is verified to be valid, the flags of the terminal can be successfully rewritten; and different CA states of the terminal are safely switched.

Technical terms involved in the invention are interpreted as follows.

| Technical term | Interpretation |
| --- | --- |
| CA | Certificate Authority, the Certificate Authority herein refers specifically to a root certificate issued by a third-party company such as LANDI company, and all the other certificates are issued by this certificate |
| flag | Some bytes stored in a FLASH inside CPU, which may be modified |
| firmware | Firmware including but not limited to programs used in the terminal and various configuration files that are required |
| certificate | The certificate typically only contains the public key and the superior's signature on the certificate. An inferior certificate is signed by the superior using its own private key. The superior certificate can be preset in the terminal, and the public key of the superior certificate can be used to verify the inferior certificate. |
| secure storage medium | Medium for storing the public key and private key of the certificate, including but not limited to IC card, U-key. When operating the private key therein, the PIN password is required to be entered as ID verification for the secure storage medium. |

Figure 1:
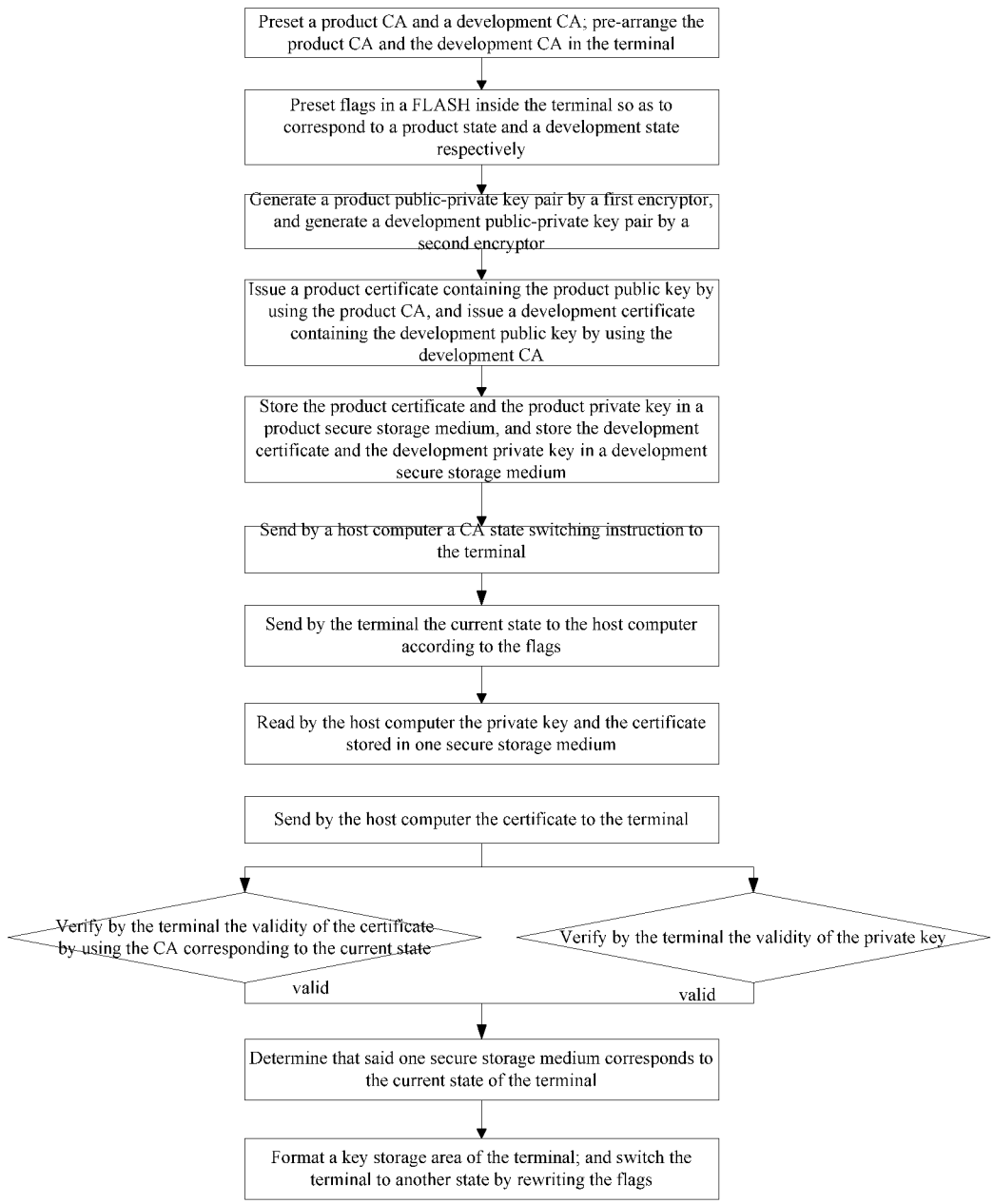
FIG. 1 is a flowchart block diagram of a method for safely switching between product mode and development mode of a terminal according to the invention.
Figure 2:
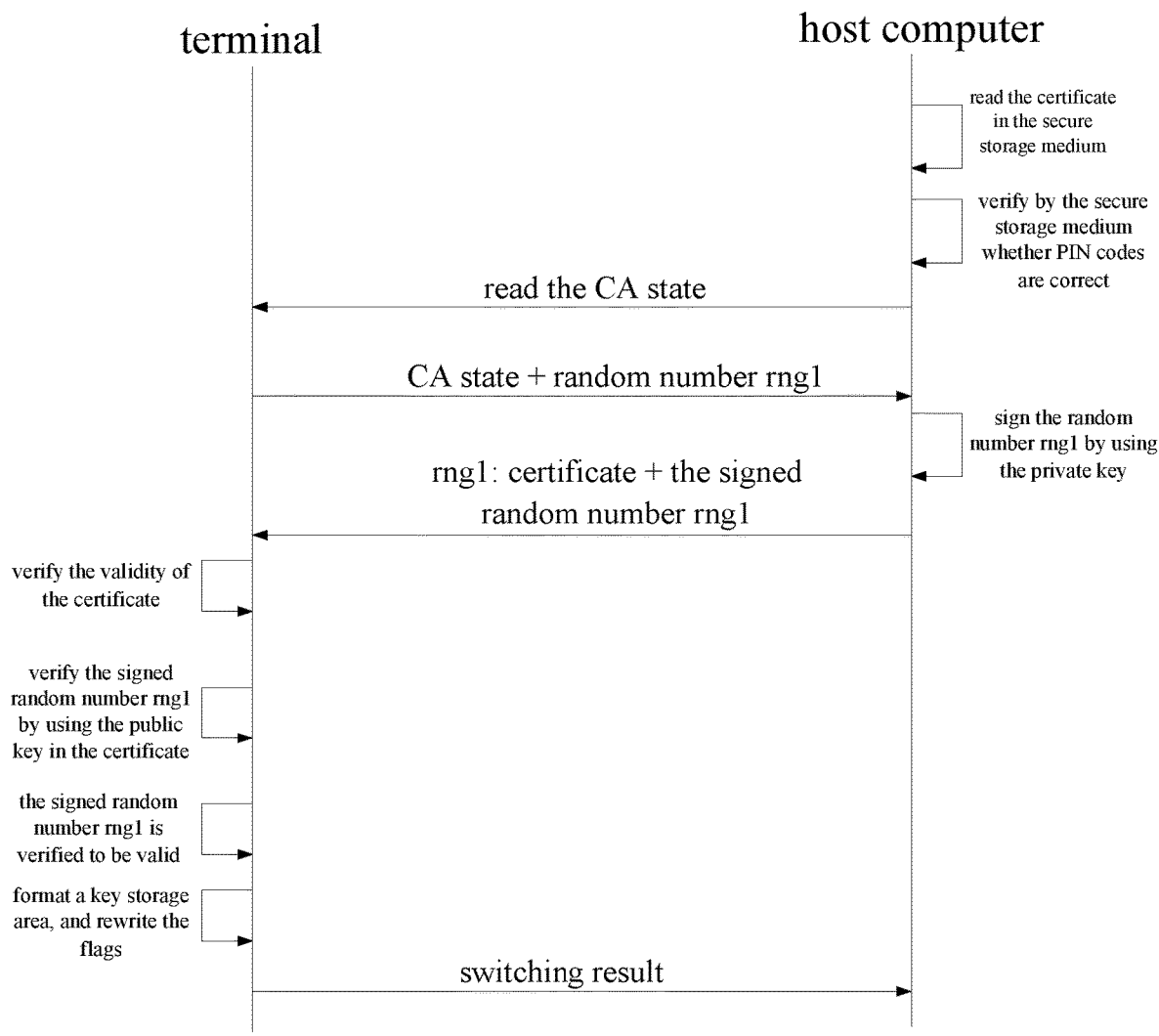
FIG. 2 is a diagram of data interaction between a terminal and a host computer in a method for safely switching between product mode and development mode of a terminal according to an embodiment of the invention.

Referring to FIG. 1 and FIG. 2, the invention provides a method for safely switching between product mode and development mode of a terminal, comprising:

presetting a product CA and a development CA; pre-arranging the product CA and the development CA in the terminal;

presetting flags in a FLASH inside the terminal so as to correspond to a product state and a development state respectively;

generating a product public-private key pair by a first encryptor, and generating a development public-private key pair by a second encryptor;

issuing a product certificate containing the product public key by using the product CA, and issuing a development certificate containing the development public key by using the development CA;

storing the product certificate and the product private key in a product secure storage medium, and storing the development certificate and the development private key in a development secure storage medium;

sending by a host computer a CA state switching instruction to the terminal;

sending by the terminal the current state to the host computer according to the flags;

reading by the host computer the private key and the certificate stored in one secure storage medium;

sending by the host computer the certificate to the terminal;

verifying by the terminal the validity of the certificate by using the CA corresponding to the current state so as to obtain a fifth verification result;

verifying by the terminal the validity of the private key so as to obtain a sixth verification result;

determining that said one secure storage medium corresponds to the current state of the terminal, if the results of both the fifth verification and the sixth verification are valid; and formatting a key storage area of the terminal; and switching the terminal to another state by rewriting the flags.

It should be noted that in the FLASH inside the CPU, there is a flag for indicating whether the terminal is a development CA or a product CA. This flag can be expressed by four bytes, for example, the data being 0xFFFFFFFF represents that the terminal is in the product mode, and the data being 0xABABABAB represents that the terminal currently is in the development mode. The FLASH has a characteristic of being written to 0xFF after being erased so that the default state is the product state.

During the terminal state switching, the sensitive information on the current state of the terminal can be cleared by formatting the key storage area of the terminal. For example, before being switched to the development mode, information corresponding to the product state such as key and certificate is cleared so as to prevent the sensitive information on the product state from being used in the development state by mistake, thus improving the safety of the terminal.

As can be seen from the above description, the invention has the following advantages: the development CA and the product CA are configured for the development stage and the product stage respectively in the invention; and the certificates and the public-private key pairs are stored into the development secure storage medium and the product secure storage medium respectively. Only if the host computer is verified to be valid by the terminal using the certificates and the public-private key pairs stored in the secure storage media, the state of the terminal can be switched successfully, and the safety of the terminal is ensured.

Further, "issuing a product certificate containing the product public key by using the product CA, and issuing a development certificate containing the development public key by using the development CA" is specifically:

signing the product public key by using a product root private key in the product CA so as to generate a product certificate signature;

generating a product certificate containing the product public key and the product certificate signature;

signing the development public key by using a development root private key in the development CA so as to generate a development certificate signature; and generating a development certificate containing the development public key and the development certificate signature.

As can be seen from the above description, according to the invention, a dedicated product CA is configured for the terminal in the product stage, and the corresponding product public-private key pair is issued by the product CA; a dedicated development CA is configured for the terminal in the development stage, and the corresponding development public-private key pair is issued by the development CA so that the terminal in the product stage and the terminal in the development stage can be essentially distinguished.

Further, "sending by the terminal the current state to the host computer according to the flags" is specifically:

sending by the terminal the current state and a first random number to the host computer according to the flags.

Further, "verifying by the terminal the validity of the certificate by using the CA corresponding to the current state so as to obtain a fifth verification result; verifying by the terminal the validity of the private key so as to obtain a sixth verification result; determining that said one secure storage medium corresponds to the current state of the terminal, if the results of both the fifth verification and the sixth verification are valid" is specifically:

signing the first random number by the host computer using the private key so as to generate a signed first random number;

sending the signed first random number and the certificate to the terminal;

verifying by the terminal the certificate signature in the certificate by using the CA corresponding to the current state;

verifying the signed first random number by using the public key in the certificate, if the certificate signature in the certificate is verified to be valid;

determining that said one secure storage medium corresponds to the current state of the terminal, if the signed first random number is verified to be valid.

As can be seen from the above description, according to the invention, the validity of the certificate and the private key in the secure storage medium is verified by using the CA corresponding to the current state of the terminal, and thus the authority of the host computer is verified by the terminal; and the reliability of the verification process is ensured.

Further, before "reading by the host computer the private key and the certificate stored in one secure storage medium", the method further includes:

presetting PIN codes corresponding to said one secure storage medium;

acquiring by terminal the input PIN codes; sending the PIN codes to said one secure storage medium;

verifying by said one secure storage medium the correctness of the PIN codes;

and performing "reading by the host computer the private key and the certificate stored in one secure storage medium", if the PIN codes are verified to valid.

As can be seen from the above description, according to the invention, the PIN codes corresponding to the secure storage medium can be preset, and the PIN codes are required to be verified after the host computer is connected to the secure storage medium. The validity of the secure storage medium and the owner of the secure storage medium are verified so as to ensure that the secure storage medium is used by the valid user, thus improving the safety of the terminal state switching.

Further, the secure storage medium is an IC card or U-Key.

As can be seen from the above description, the secure storage medium may be in a form of an IC card or U-Key, which is user-friendly and has high secure storage performance.

Figure 3:
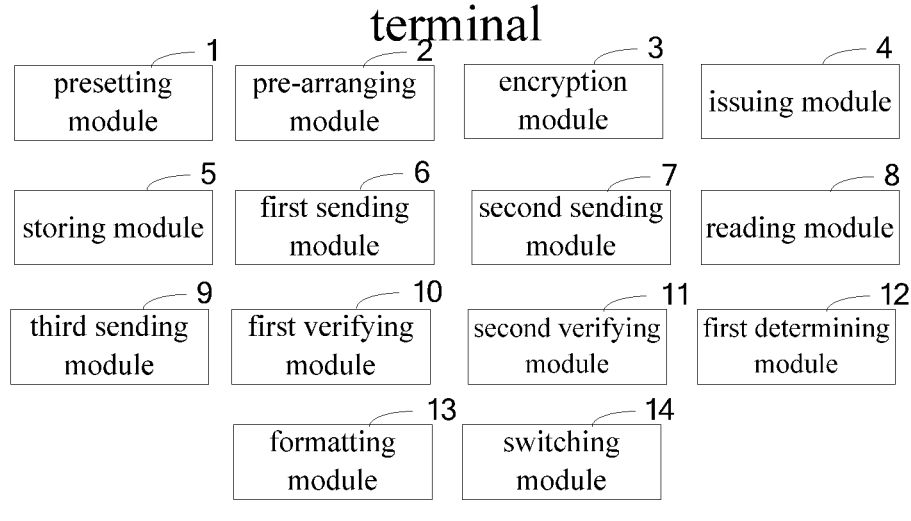
FIG. 3 is a structural component block diagram of a system for safely switching between product mode and development mode of a terminal according to the invention.

Referring to FIG. 3, the invention provides the following second technical solution.

a system for safely switching between product mode and development mode of a terminal, comprising:

a presetting module 1 which is configured for presetting a product CA and a development CA, and presetting flags in a FLASH inside the terminal to correspond to a product state and a development state respectively;

a pre-arranging module 2 which is configured for pre-arranging the product CA and the development CA in the terminal;

an encryption module 3 which is configured for generating a product public-private key pair using a first encryptor, and generating a development public-private key pair using a second encryptor;

an issuing module 4 which is configured for issuing a product certificate containing the product public key by using the product CA, and issuing a development certificate containing the development public key by using the development CA;

a storing module 5 which is configured for storing the product certificate and the product private key in a product secure storage medium, and storing the development certificate and the development private key in a development secure storage medium;

a first sending module 6 which is configured for sending a CA state switching instruction to the terminal by a host computer;

a second sending module 7 which is configured for sending the current state to the host computer by the terminal according to the flags;

a reading module 8 which is configured for reading by the host computer the private key and the certificate stored in one secure storage medium;

a third sending module 9 which is configured for sending the certificate to the terminal by the host computer;

a first verifying module 10 which is configured for verifying the validity of the certificate by the terminal using the CA corresponding to the current state so as to obtain a fifth verification result;

a second verifying module 11 which is configured for verifying the validity of the private key by the terminal so as to obtain a sixth verification result;

a first determining module 12 which is configured for determining that said one secure storage medium corresponds to the current state of the terminal, if the results of both the fifth verification result and the sixth verification are valid;

a formatting module 13 which is configured for formatting a key storage area of the terminal; and a switching module 14 which is configured for switching the terminal to another state by rewriting the flags.

As can be seen from the above description, the invention has the following advantageous effects: the private key and the certificate stored in the secure storage medium can be read by the host computer, and the host computer is interacted with the terminal so that the terminal states can be switched safely.

Preferably, the system for safely switching between product mode and development mode of a terminal includes a host computer, a terminal and a secure storage medium, wherein the host computer includes the first sending module 6, the reading module 8 and the third sending module 9, and the terminal includes the second sending module 7, the first verifying module 10, the second verifying module 11, the first determining module 12, the formatting module 13, and the switching module 14.

Further, the second sending module 7 is specifically configured for sending by the terminal the current state and a first random number to the host computer according to the flags.

Figure 4:
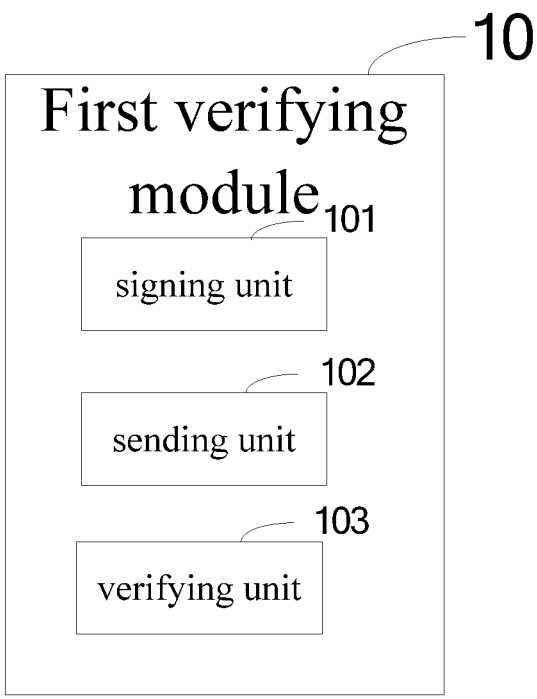
FIG. 4 is a structural component block diagram of a first verifying module in a system for safely switching between product mode and development mode of a terminal according to an embodiment of the invention.

Further, referring to FIG. 4, the first verifying module 10 includes a signing unit 101, a sending unit 102 and a verifying unit 103, wherein the signing unit 101 is configured for signing the first random number by the host computer using the private key so as to generate a signed first random number;

the sending unit 102 is configured for sending the signed first random number and the certificate to the terminal;

the verifying unit 103 is configured for verifying by the terminal the certificate signature in the certificate by using the CA corresponding to the current state;

the second verifying module 11 is specifically configured for verifying the signed first random number by using the public key in the certificate, if the certificate signature in the certificate is verified by the verifying unit 103 to be valid; and the first determining module 12 is specifically configured for determining that said one secure storage medium corresponds to the current state of the terminal, if the signed first random number is verified to be valid.

As can be seen from the above description, according to the invention, the validity of the certificate and the private key in the secure storage medium is verified by the first verifying module 10 and the second verifying module 11 using the CA corresponding to the current state of the terminal, and thereby the authority of the host computer is verified by the terminal, thus ensuring the reliability of the verification process.

Further, the secure storage medium is an IC card or U-Key.

As can be seen from the above description, the secure storage medium may be in a form of an IC card or U-Key, which is user-friendly and has high secure storage performance.

Referring to FIG. 2, a first embodiment of the disclosure is described as follows.

A method for safely switching between product mode and development mode of a terminal, in which the secure storage medium is an IC signature card, and the terminal is a POS terminal.

A product CA and a development CA are preset, and the product CA and the development CA are pre-arranged in the POS terminal simultaneously. The product CA and the development CA may be different digital certificate authorities developed by different third-party organizations or third-party companies. Of course, the product CA and the development CA may be different digital certificate authorities developed by the same organization or company.

In a case that the flags in a FLASH inside the POS terminal is preset to be 0xFFFFFFFF, the POS terminal is in a product state; and in a case that the flags in a FLASH inside the POS terminal is preset to be 0xABABABAB, the POS terminal is in a development state.

A product public-private key pair is generated by a first encryptor, and the product public key is signed by using a product root private key in the product CA so as to generate a product certificate signature; a product certificate containing the product public key and the product certificate signature is generated; the product certificate and the product private key are stored in a product IC signature card, and PIN codes corresponding to the product IC signature card are preset. The PIN codes for each IC signature card may be different.

A development public-private key pair is generated by a second encryptor, and the development public key is signed by using a development root private key in the development CA so as to generate a development certificate signature; a development certificate containing the development public key and the development certificate signature is generated; the development certificate and the development private key are stored in a development IC signature card, and PIN codes corresponding to the development IC signature card are preset.

The product IC signature card is inserted by the product staff into an IC card interface of the host computer.

The product IC signature card is read by the host computer, and a CA state switching instruction is sent by the host computer to the POS terminal.

The CA state switching instruction is received by the POS terminal, and it is determined by the POS terminal whether the flags are 0xFFFFFFFF. If the flags are not 0xFFFFFFFF, it is determined that the POS terminal is currently in the development state, then a prompt that the IC signature card does not correspond to the current state is given and the operation cannot be executed, and the process ends.

If the flags are 0xFFFFFFFF, it is determined that the POS terminal is currently in the product state, the current state and a first random number are returned to the host computer by the POS terminal.

The current state and the first random number returned by the POS terminal are received by the host computer, and a prompt of inputting PIN codes is given.

The PIN codes input by the product staff are received by the host computer, and it is verified by the product IC signature card whether the PIN codes are consistent with the preset PIN codes. If they are not consistent, a prompt of erroneous PIN codes is given, and the process ends.

If the PIN codes are consistent with the preset PIN codes, it is determined that the product IC signature card is validly owned by the user who inserted the card.

The certificate and the private key stored in the product IC signature card are acquired by the host computer, and the first random number rng1 is signed by using the private key so as to generate a signed first random number E(rng1).

The signed first random number E(rng1) and the product certificate are sent by the host computer to the POS terminal.

The product certificate is received by the POS terminal, and the product certificate signature in the product certificate is verified by the POS terminal using the product root public key of the product CA.

If the product certificate signature is verified to be valid, it is determined that the product certificate is a valid certificate.

The signed first random number E(rng1) is verified by the POS terminal using the product public key Puk in the product certificate.

If the signed first random number E(rng1) is verified to be valid, it is determined that the private key stored in the product IC signature card is a valid private key, and then it is determined that the product secure storage medium is a valid product secure storage medium.

The key storage area of the terminal is formatted, and the sensitive information on the product state such as key and certificate is cleared, and the flags are rewritten to be 0xABABABAB so as to switch the state of the terminal to be the development CA state.

The developers use the development IC signature card to execute a state switching operation on the POS terminal by the host computer, and the process required for switching the POS terminal from the development state to the product state is consistent with the above process required for switching the state of the product to the development state and is not repeated herein.

Referring to FIG. 3 and FIG. 4, the invention provides the following second embodiment.

A system for safely switching between product mode and development mode of a terminal, comprising:

a presetting module 1 which is configured for presetting a product CA and a development CA, and presetting flags in a FLASH inside the terminal to correspond to a product state and a development state respectively;

a pre-arranging module 2 which is configured for pre-arranging the product CA and the development CA in the terminal;

an encryption module 3 which is configured for generating a product public-private key pair using a first encryptor, and generating a development public-private key pair using a second encryptor;

an issuing module 4 which is configured for issuing a product certificate containing the product public key by using the product CA, and issuing a development certificate containing the development public key by using the development CA;

a storing module 5 which is configured for storing the product certificate and the product private key in a product secure storage medium, and storing the development certificate and the development private key in a development secure storage medium;

a first sending module 6 which is configured for sending a CA state switching instruction to the terminal by a host computer;

a second sending module 7 which is configured for sending the current state and a first random number to the host computer by the terminal according to the flags;

a reading module 8 which is configured for reading by the host computer the private key and the certificate stored in one secure storage medium;

a third sending module 9 which is configured for sending the certificate to the terminal by the host computer;

a first verifying module 10 which is configured for verifying the validity of the certificate by the terminal using the CA corresponding to the current state so as to obtain a fifth verification result; specifically, the first verifying module 10 comprises a signing unit 101, a sending unit 102 and a verifying unit 103;

the signing unit 101 being configured for signing the first random number by the host computer using the private key so as to generate a signed first random number;

the sending unit 102 being configured for sending the signed first random number and the certificate to the terminal;

the verifying unit 103 being configured for verifying by the terminal the certificate signature in the certificate by using the CA corresponding to the current state;

a second verifying module 11 which is configured for verifying the signed first random number by using the public key in the certificate, if the certificate signature in the certificate is verified by the verifying unit 103 to be valid;

a first determining module 12 which is configured for determining that said one secure storage medium corresponds to the current state of the terminal, if the signed first random number is verified to be valid;

a formatting module 13 which is configured for formatting a key storage area of the terminal; and a switching module 14 which is configured for switching the terminal to another state by rewriting the flags.

In summary, the method and system for safely switching between product mode and development mode of a terminal provided by the invention provides are distinguished from the prior art in which different stages cannot be essentially distinguished for the terminal, which may cause accidental circulation of the terminal in a testing development version into the market, thus posing a hidden safety risk. According to the invention, different Certificate Authorities (CAs) are configured for the terminal at different stages; by storing the public-private key pairs of the certificates issued by different CAs in different secure storage media, only if the secure storage medium corresponding to the current CA state of the terminal is verified to be valid, the flags of the terminal can be successfully rewritten; a safe switching between different CA states of the terminal is realized. The terminal states can be switched through an interaction between the terminal and the host computer, and it is ensured that different states of a terminal without interface configuration still can be realized. Meanwhile, a verification of the identity of the operator for state switching is also included so as to ensure the validity of the operator. Further, different priority levels can be also set for different states of the terminal, thus achieving safe and fast switching.

What is claimed is:

1. A method for safely switching between product mode and development mode of a terminal, characterized by comprising:

presetting a product CA and a development CA; pre-arranging the product CA and the development CA in the terminal;

presetting flags in a FLASH inside the terminal so as to correspond to a product state and a development state respectively;

generating a product public-private key pair by a first encryptor, and generating a development public-private key pair by a second encryptor;

issuing a product certificate containing the product public key by using the product CA, and issuing a development certificate containing the development public key by using the development CA;

storing the product certificate and the product private key in a product secure storage medium, and storing the development certificate and the development private key in a development secure storage medium;

sending by a host computer a CA state switching instruction to the terminal;

sending by the terminal the current state to the host computer according to the flags;

reading by the host computer the private key and the certificate stored in one secure storage medium;

sending by the host computer the certificate to the terminal;

verifying by the terminal the validity of the certificate by using the CA corresponding to the current state so as to obtain a fifth verification result;

verifying by the terminal the validity of the private key so as to obtain a sixth verification result;

determining that said one secure storage medium corresponds to the current state of the terminal, if the results of both the fifth verification and the sixth verification are valid; and formatting a key storage area of the terminal; and switching the terminal to another state by rewriting the flags;

wherein "sending by the terminal the current state to the host computer according to the flags" is specifically:

sending by the terminal the current state and a first random number to the host computer according to the flags.

2. The method for safely switching between product mode and development mode of a terminal according to claim 1, wherein "issuing a product certificate containing the product public key by using the product CA, and issuing a development certificate containing the development public key by using the development CA" is specifically:

signing the product public key by using a product root private key in the product CA so as to generate a product certificate signature;

generating a product certificate containing the product public key and the product certificate signature;

signing the development public key by using a development root private key in the development CA so as to generate a development certificate signature; and generating a development certificate containing the development public key and the development certificate signature.

3. The method for safely switching between product mode and development mode of a terminal according to claim 1, wherein "verifying by the terminal the validity of the certificate by using the CA corresponding to the current state so as to obtain a fifth verification result; verifying by the terminal the validity of the private key so as to obtain a sixth verification result; determining that said one secure storage medium corresponds to the current state of the terminal, if the results of both the fifth verification and the sixth verification are valid" is specifically:

signing the first random number by the host computer using the private key so as to generate a signed first random number;

sending the signed first random number and the certificate to the terminal;

verifying by the terminal the certificate signature in the certificate by using the CA corresponding to the current state;

verifying the signed first random number by using the public key in the certificate, if the certificate signature in the certificate is verified to be valid;

determining that said one secure storage medium corresponds to the current state of the terminal, if the signed first random number is verified to be valid.

4. The method for safely switching between product mode and development mode of a terminal according to claim 1, wherein before "reading by the host computer the private key and the certificate stored in one secure storage medium", the method further includes:

presetting PIN codes corresponding to said one secure storage medium;

acquiring by terminal the input PIN codes; sending the PIN codes to said one secure storage medium;

verifying by said one secure storage medium the correctness of the PIN codes; and performing "reading by the host computer the private key and the certificate stored in one secure storage medium", if the PIN codes are verified to valid.

5. The method for safely switching between product mode and development mode of a terminal according to claim 2, wherein before "reading by the host computer the private key and the certificate stored in one secure storage medium", the method further includes:

presetting PIN codes corresponding to said one secure storage medium;

acquiring by terminal the input PIN codes; sending the PIN codes to said one secure storage medium;

verifying by said one secure storage medium the correctness of the PIN codes; and performing "reading by the host computer the private key and the certificate stored in one secure storage medium", if the PIN codes are verified to valid.

6. The method for safely switching between product mode and development mode of a terminal according to claim 3, wherein before "reading by the host computer the private key and the certificate stored in one secure storage medium", the method further includes:

presetting PIN codes corresponding to said one secure storage medium;

acquiring by terminal the input PIN codes; sending the PIN codes to said one secure storage medium;

verifying by said one secure storage medium the correctness of the PIN codes; and performing "reading by the host computer the private key and the certificate stored in one secure storage medium", if the PIN codes are verified to valid.

7. The method for safely switching between product mode and development mode of a terminal according to claim 1, wherein the "secure storage medium" is an IC card or U-Key.

8. The method for safely switching between product mode and development mode of a terminal according to claim 2, wherein the "secure storage medium" is an IC card or U-Key.

9. The method for safely switching between product mode and development mode of a terminal according to claim 3, wherein the "secure storage medium" is an IC card or U-Key.

\* \* \* \* \*